(12) United States Patent
DiMarino

(10) Patent No.: US 12,697,191 B2
(45) Date of Patent: *Aug. 4, 2026

(54) ADJUSTABLE DENTAL IMPRESSION TRAY WITH ADAPTIVE LOCK

(71) Applicant: James C. DiMarino, Naples, FL (US)

(72) Inventor: James C. DiMarino, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/171,502

(22) Filed: Apr. 7, 2025

(65) Prior Publication Data

US 2025/0235295 A1 Jul. 24, 2025

Related U.S. Application Data

(63) Continuation of application No. 17/807,155, filed on Jun. 16, 2022, now Pat. No. 12,290,421, which is a continuation of application No. 14/996,203, filed on Jan. 14, 2016, now abandoned.

(60) Provisional application No. 62/103,514, filed on Jan. 14, 2015.

(51) Int. Cl.
*A61C 9/00* (2006.01)
*A61C 19/04* (2006.01)

(52) U.S. Cl.
CPC ............ *A61C 9/0006* (2013.01); *A61C 19/04* (2013.01)

(58) Field of Classification Search
CPC .... A61C 9/00–0013; A61F 5/566; A61F 5/56; A61F 2005/563; A61B 5/0088; A61M 16/0488
See application file for complete search history.

(56) References Cited

U.S. PATENT DOCUMENTS

| | | | | |
|---|---|---|---|---|
| 4,145,812 A | * | 3/1979 | Johnson | A61C 9/0006 |
| | | | | 433/41 |
| 5,297,960 A | * | 3/1994 | Burns | A61C 9/0006 |
| | | | | 433/41 |
| 6,629,841 B1 | * | 10/2003 | Skinner | A61C 9/0006 |
| | | | | 433/43 |
| 2009/0298007 A1 | * | 12/2009 | Walter | A61C 9/0006 |
| | | | | 433/38 |
| 2017/0007376 A1 | * | 1/2017 | Kim | A61C 9/0006 |
| 2017/0202648 A1 | * | 7/2017 | DiMarino | A61C 19/04 |

* cited by examiner

*Primary Examiner* — Edelmira Bosques
*Assistant Examiner* — Matthew P Saunders
(74) *Attorney, Agent, or Firm* — Emmett S. Collazo; Jonathan M. Waldman

(57) ABSTRACT

An improved dental impression tray system provides a way to accommodate multiple arch sizes. The tray is adjustable and has an anterior section with two distal ends and a posterior section with two distal ends. The two sections are connected together at their distal ends. A mesh membrane extends between the sections to maintain the impression material. The ends of the posterior section include a plurality of vertical pins and a vertical opening is located adjacent each distal end of said anterior section. To adjust the size of the tray, the distal ends of the anterior section can be disconnected from said distal ends of the posterior section and then reconnected by inserting the pins into the opening. Further size adjustments can be made by removing additional pins and inserting the next remaining pins into the openings.

20 Claims, 5 Drawing Sheets

200

ADJUSTABLE DENTAL IMPRESSION TRAY WITH ADAPTIVE LOCK

CROSS REFERENCE TO RELATED APPLICATIONS

This patent application claims the benefit of priority to U.S. application Ser. No. 17/807,155, filed Jun. 16, 2022, which claims the benefit of priority to U.S. application Ser. No. 14/996,203 filed Jan. 14, 2016, which claims the benefit of priority to U.S. Provisional Patent Application No. 62/103,514, filed Jan. 14, 2015, all of which are hereby incorporated by reference in their entireties.

FIELD OF THE INVENTION

This invention relates generally to a dental instrument and, more particularly, to trays for obtaining an impression of a patient's oral anatomy. In the field of dentistry, a dental impression is a negative imprint of hard and soft tissues (teeth and gums, generally) in the mouth from which a positive reproduction of a cast or mold can be formed. The present invention allows dental professionals to more efficiently create positive reproductions from negative imprints of single and double arch dental impressions, and from these positive reproductions, create models, in fewer steps than are currently used in the profession, and with less waste.

BACKGROUND

The current state of the art for taking dental impressions with impression material requires an impression tray that best accommodates each patient's individual intra-oral anatomy. Dental impression trays come in various shapes and sizes and are commonly categorized into large/medium/small, single-arch/open mouth and dual-arch/closed-bite varieties. Additionally, these trays can be either reusable (sterilizable) or disposable. Common steps required to select the appropriate tray for a dental impression are described below.

The dental professional will select a series of different sized trays which he/she believes may best suit the patient and sets the trays in the dental operatory, along with the impression tray material, in preparation for the patient's visit. Dental operators have the choice of selecting reusable (sterilizable) or disposable impression trays. To maximize the efficiency of the appointment, the dental operator often selects three trays of different sizes, before the patient arrives, so that the operator is prepared with multiple options in one place to find the best fit for the patient. Selecting only one tray in the hopes that it is the perfect fit could cause time delays, for example, causing an appointment time to be extended, if that first tray does not fit. The dental operator would then leave the dental operatory, remove his/her gloves, follow proper infection control protocol to select and prepare a larger or smaller impression tray, and repeat the process.

The dental operator also has the choice of selecting a single-arch/open mouth or dual-arch/closed-bite impression tray. If the dental operator selects a single-arch/open mouth impression design, the operator may have to prepare small, medium, and large upper impression trays as well as small, medium, and large lower impression trays for a total of six impression trays in order to find the best fit for the upper and lower arches. If the dental operator selects a dual-arch/closed-bite impression design, the operator may have to prepare small, medium, and large dual-arch/closed-bite impression trays for a total of three impression trays in order to find the best fit as the dual-arch/closed-bite impression design simultaneously captures both the upper and lower arches in one impression.

If the impression tray design selected is a single-arch/open mouth tray, the operator must try in each upper tray and each lower tray individually to determine which fits the best. This process could require that six or more trays be tried in, three or more on the upper and three or more for the lower.

Each time a tray does not fit and it is a reusable tray, each tray must be cycled through the sterilization process, which takes time and takes up space in the sterilization process that may impact other instruments in the sterilization process required for other, more expensive or urgent dental procedures.

If the impression tray design selected is a disposable tray, it must be discarded in order to comply with proper infection control procedures since it has been presented and exposed to at least aerosols in the dental operatory from patient treatment, sneezing, airborne contaminants, etc. but certainly to saliva for any of which were placed in the mouth, and cannot be sterilized for use with another patient, which costs money for each tray discarded. Optionally, disposable trays could be properly protected from such contaminants so that they would not be exposed but this process requires additional time, materials and costs.

If the impression tray design selected is a dual-arch/closed bite tray, the operator may try in three or more trays to determine the best fit which is less than the single arch technique since these trays capture both the upper and lower impressions simultaneously, however each tray may cost more than a single arch tray.

Each time a tray does not fit and it is a reusable tray each tray must be cycled through the sterilization process, which takes time and takes up space in the sterilization process that may impact other instruments in the sterilization process required for other, more expensive dental procedures. If it is a disposable tray, it must be discarded in order to comply with proper infection control procedures since it has been presented and exposed to aerosols in the dental operatory from patient treatment, sneezing, airborne contaminants, etc and cannot be sterilized for use with another patient, which costs money for each tray discarded. Dual-arch/closed bite impression trays typically cost more money than single-arch/open mouth impression trays which adds up quickly in this scenario. Optionally, disposable trays could be properly protected from such contaminants so that they would not be exposed but this process requires additional time, materials and costs.

Furthermore, every time an impression tray is tried into a patient's mouth and does not fit, the tray has to be removed, the operator has to select another tray, the operator has to try in the next tray and repeat this process until the appropriate size tray is found for each arch. This process takes time, can cause frustration for the patient and the operator, and costs money.

Additionally, patients are repeatedly asked to open their mouths so that a tray can be tried in increases the chance that the patient may be injured in this process. (E.g., splitting a lip due to the stretching to place and remove the tray, cutting the lip/cheek/tongue/vestibule/soft tissue with a tray edge or sectioned remnant, etc.)

Even further, every time an impression tray is tried into a patient's mouth and does not fit, it costs money and time to either sterilize and restock the reusable impression trays or dispose of and re-order new disposable impression trays.

There are some single-arch/open bite impression materials that allow for breaking off of a posterior section of the tray to accommodate the arch size, but this can distort the tray and leave rough/sharp edges that can irritate or injure the patient. And, as is known in the art, utilizing the wrong size tray or a distorted tray can lead to distorted models which can result in ill-fitting dental restorations, appliances, etc., which would require the process to be repeated at a substantial cost to the dental office and source of frustration to the patient. Therefore, it is important that the correct size dental impression tray be used for each individual patient.

Dental offices often take impressions using a single-arch/open mouth and dual-arch/closed-bite impression tray for many procedures including but not limited to: crowns, bridges, inlays, onlays, veneers, implants, application of therapeutics, whitening trays, mouthguards, nightguards, study models, orthodontic models, custom tray fabrication, removable prosthodontic appliance fabrication/repair, sleep/snore appliances, delivery of medications, customized scenarios, or other uses.

Dental impression trays for obtaining an impression of a patient's dentition are known. Such trays generally include tray portions anatomically contoured to fit at least a part of a patient's upper and/or lower oral anatomy, of which an impression is to be obtained. Each patient has a different size dental arch which requires that an appropriate size impression tray is chosen so as to best fit the patient and captured the desired anatomy. The anterior portion of an impression tray can be considered somewhat universal in arch form which can allow for a tray to be sectioned at an anterior portion so as to most adequately fit children and adult patients. Typically the length of the arch from the anterior teeth to the posterior teeth and width of the arch from left to right increases with the dental age of the patient.

There are mainly two techniques to taking dental impressions; the single arch or open mouth and the dual arch or closed bite techniques. In both techniques it is imperative that the correct size impression tray that best matches the patient's oral anatomy and arch form be used. In a single arch technique, the tray portion is loaded with a suitable dental impression material and situated over the part of the patient's oral anatomy of which an impression is desired: the upper or lower arch or a section thereof. The operator then guides the single-arch impression tray over the oral anatomy to form an impression of the patient's oral anatomy in the impression material. In the closed bite technique, the tray portion is loaded with a suitable dental impression material and situated over the part of the patient's oral anatomy of which an impression is desired.

The patient then bites into the impression material to form an impression of the patient's oral anatomy in the impression material. As the patient bites into the impression material in a dual-arch/closed bite impression tray, the oral anatomy forces the impression material up against the teeth and then against the tray walls which then captures the anatomy of the upper and lower arches at one time.

After the impression material sets, it is used as a mold, into which plaster or dental stone can be poured which upon setting forms a model of the patient's oral anatomy. In addition, the set impression material in the impression tray may also be used directly as a mold for other purposes such as but not limited to: the fabrication of temporary restorations, the process of teeth whitening, and multiple other uses known in the art and referenced above and below. A problem encountered in the use of conventional single or dual arch dental impression trays is that trays come in different sizes which must be properly selected by the operator in order to capture an accurate recording of the patient's oral anatomy. As discussed above, the operator must prepare several sizes of impression trays before the patient arrives and then try each one into the patient's mouth to determine which offers the best fit. These trays can be either reusable or disposable. If reusable, each tray that was not selected for the patient must be disinfected, sterilized, and restocked. If disposable, any tray that was not selected must be discarded unless it was properly presented in the dental operatory to make sure it was not contaminated in any way. Each process creates the potential for added time, frustration, potential patient injury, and expense to the impression taking process.

Disposable/single-use or sterilizable/multiple use, single-arch/open mouth or dual-arch/closed bite impression trays come in various shapes and sizes each of which must be tried into a patient's mouth prior to taking the impression in order to determine which tray size is best suited for the patient's unique oral anatomy. Historically, the process of discovering which tray size is most suitable and processing or discarding or sterilizing and restocking the impression trays that were not selected is time consuming, costly, and potentially frustrating and injurious to the patient.

Attempts have been made to create single arch impression trays which can be adjustable. For example, some disposable single-arch impression trays offer removable sections which can be adjusted to create different sized or shaped trays. However, these trays tend to be sectioned at the posterior portion of the tray which can create sharp or rough edges which can injure the patient, create irregularities, or cause the tray to become distorted which can cause the impression to be inaccurate.

Dual-arch/closed bite impression trays present a substantial obstacle to creating an adjustable impression tray due to the fact that some contain a mesh membrane which is housed between the two halves of many dual-arch impression trays. This membrane holds the impression material as it is being placed into the tray and is used to support the impression material as the tray is carried to the patient's mouth through which a patient will bite. This membrane is located at the midline of some dual-arch/closed bite impression trays and held in place by both halves of the dual-arch/closed bite impression tray. These trays also include a posterior bar, which is vital to capturing the desired anatomy as it provides a framework to support the membrane, which supports the impression material and holds it in the proper position over the intended oral anatomy.

This posterior bar ensures the impression material does not slough, slant, or slide off of the mesh membrane or tray walls. This posterior bar creates a posterior support system to help keep the impression material in place and make certain that the impression material captures the most posterior portion of the oral anatomy as this bar wraps around the distal portion of the oral anatomy.

Currently, two popular dental impression materials used by dental professionals are vinyl polysiloxane (VPS) and alginate-based impression materials. Dental professionals take millions of these types of impressions each year. Alginate is one of the most popular impression materials due to its accuracy, ease of removal from the teeth, inexpensive price, and ease of use. VPS's are quite popular because they are accurate, rigid, dimensionally stable, and give predictable results; although they are much more expensive. A need exists to help take these impressions using the most popular impression materials more conveniently with an adjustable/customizable impression tray system.

SUMMARY

The present invention is designed to overcome the deficiencies of the prior art discussed above. It is an object of the present invention to provide a dental impression tray that offers the operator the ability to adjust either a single or double arch impression tray or derivative thereof to best fit the oral anatomy of the patient for the various forms of impression materials, such as, but not limited to, alginate and VPS impression materials.

It is a second objective of certain embodiments of the present invention to provide arch accommodating markings which are designed to assist the operator in customizing the tray for each patient.

It is a third objective of certain embodiments of the present invention to provide not only a way to connect or lock two pieces of the adjustable tray together, but also can reduce or eliminate any rough/sharp edges present after adjusting the size of the impression tray so as to prevent or eliminate any injury to the patient.

It is a fourth objective of certain embodiments of the present invention to contain arch accommodating markings and adaptive locking mechanisms that maintain the integrity of the poster bar of dual arch impression trays.

It is a sixth objective of certain embodiments of the present invention to provide interchangeable/interlocking sections which can allow the operator to further customize the impression tray.

In accordance with the illustrative embodiments demonstrating features and advantages of the present invention, there is provided an improved dental impression tray system that provides a way to accommodate multiple arch sizes. The tray is adjustable and has an anterior section with two distal ends and a posterior section with two distal ends. The two sections are connected together at their distal ends. A mesh membrane extends between the sections to maintain the impression material. The ends of the posterior section include a plurality of vertical pins and a vertical opening is located adjacent each distal end of said anterior section. To adjust the size of the tray, the distal ends of the anterior section can be disconnected from said distal ends of the posterior section and then reconnected by inserting the pins into the opening. Further size adjustments can be made by removing additional pins and inserting the next remaining pins into the openings.

Other objects, features, and advantages of the invention will be readily apparent from the following detailed description of the preferred embodiment thereof taken in conjunction with the drawings.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

DETAILED DESCRIPTION

Figure 1:
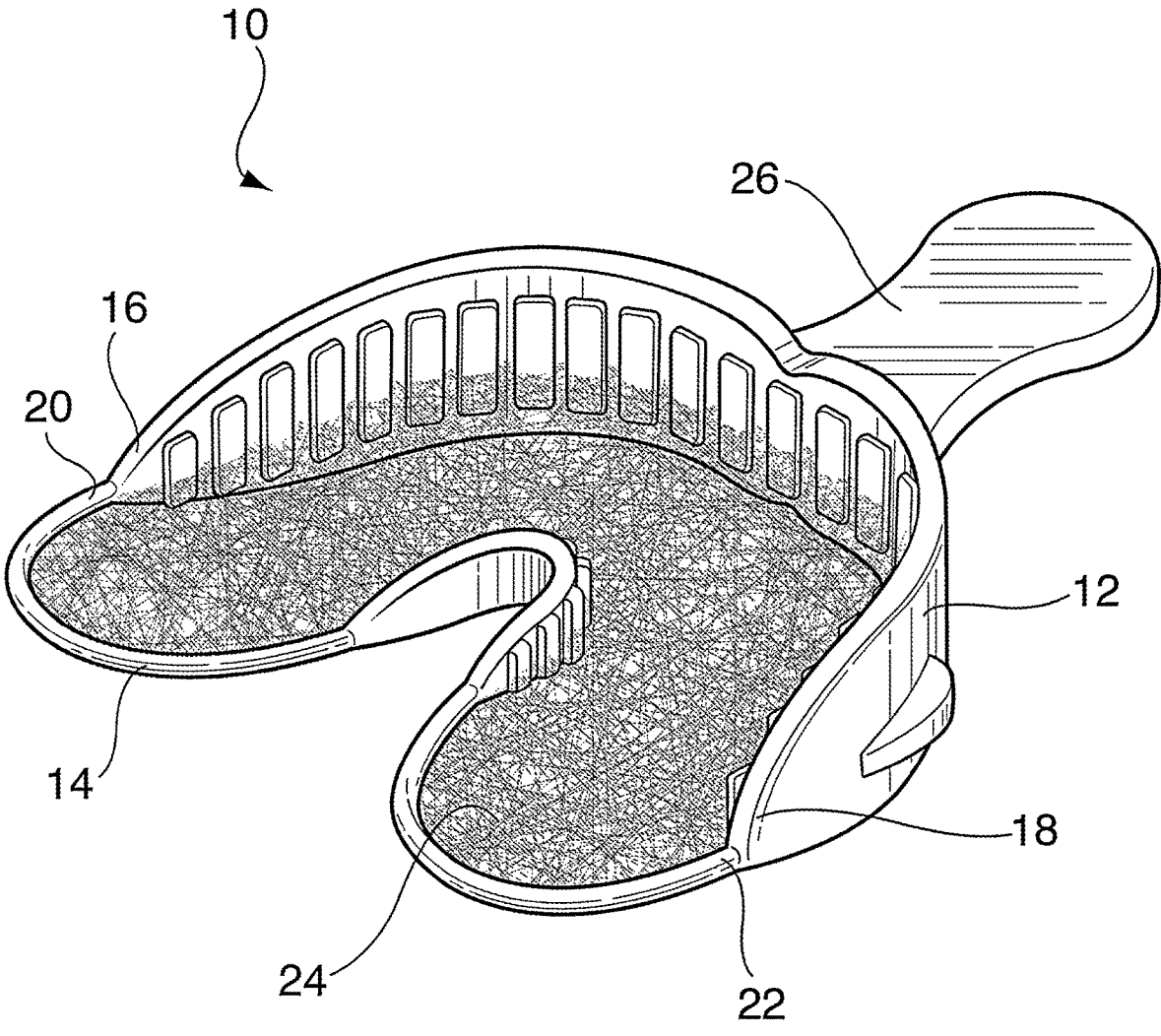
FIG. 1 is a front perspective view of a prior art dental impression tray upon which the present invention is an improvement.

Referring now to the drawings in detail wherein like reference numerals have been used throughout the various figures to designate like elements, there is shown in FIGS. 2-6 one embodiment of an adjustable dental impression tray with adaptive lock constructed in accordance with the principles of the present invention and designated generally as 100. Before describing the same, however, it will be helpful to view FIG. 1 which shows a prior art dental tray 10 upon which the present invention is an improvement.

The dental tray 10 includes an anterior section 12 and a posterior section 14. The anterior section 12 has two distal ends 16 and 18 which are connected to the distal ends 20 and 22 of the posterior section 14. A mesh membrane 24 extends between the anterior and posterior sections 12 and 14 to support and maintain investment material thereon. A handle 26 extends from the anterior section 12.

While this prior art dental tray 10 is quite useful, it is not adjustable. Accordingly, a dentist or other dental professional must have multiple similar but different size trays available for every procedure. This creates the time and expense and frustration discussed above.

The adjustable dental impression tray 100 shown in FIGS. 2-6 overcomes these problems. For convenience, the numbers used in describing FIGS. 2-6 are the same as used in the description of FIG. 1 but preceded by a "1." Thus, the tray 100 also includes an interior section 112 and a posterior section 114. These two sections 112 and 114 lie essentially in a horizontal plane. The distal ends 116 and 118 of the anterior section 112 are connected to the distal ends 120 and 122 of the posterior section 114. The tray 100 also includes a horizontally arranged mesh membrane 124 and the anterior section 112 preferably includes a handle 126.

Figure 2:
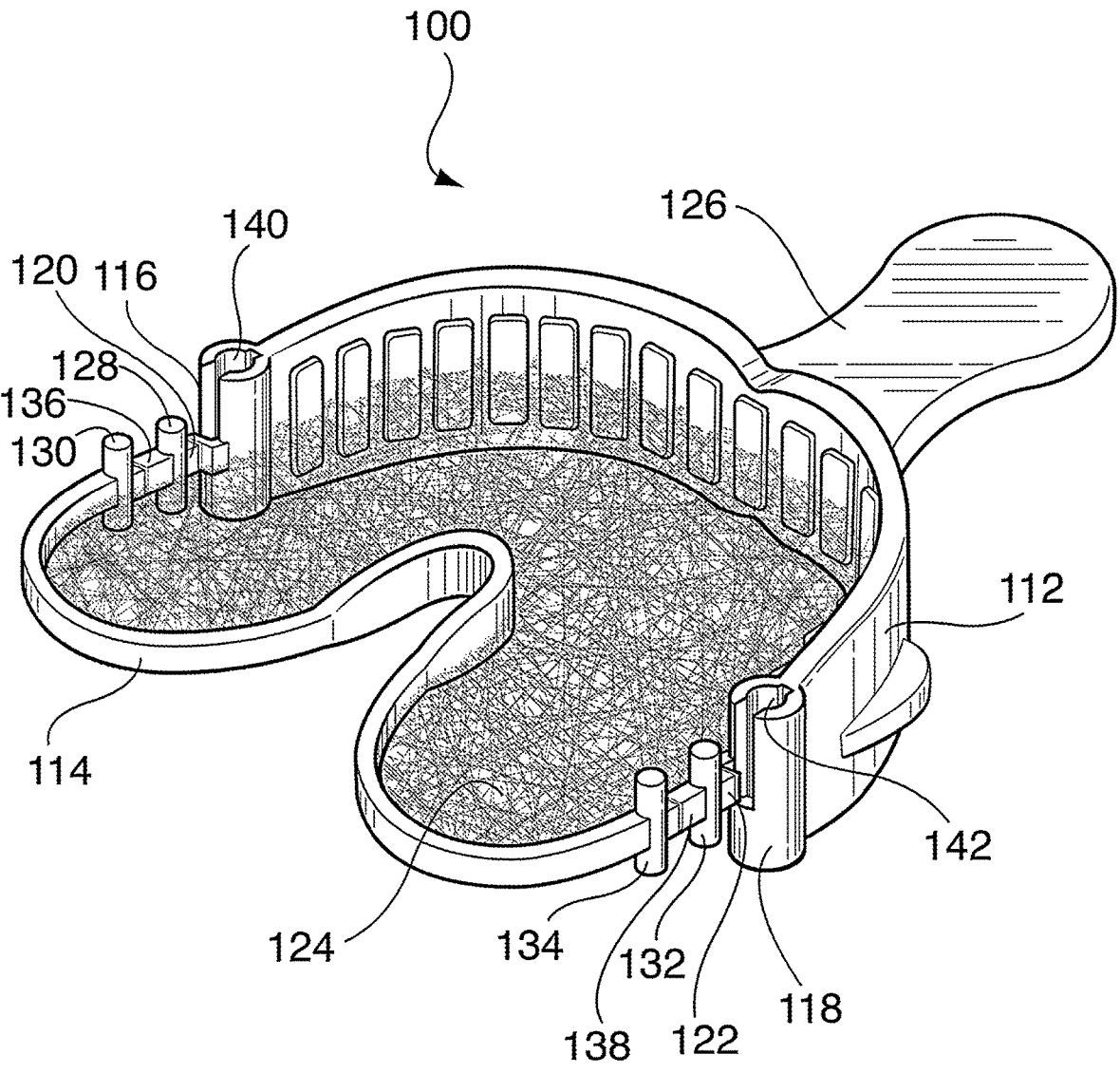
FIG. 2 is a front prospective view of the dual arch adjustable dental impression tray with adaptive lock showing my invention.

In the preferred embodiment of the invention shown in FIG. 2, the anterior and posterior sections 112 and 114 (along with the mesh 124) are all molded together. That is, the distal ends 116 and 118 of the anterior section 112 are molded to the distal ends 120 and 122 of the posterior section 114. However, these molded connections are frangible so that the ends can be broken away from each other in order to adjust the size of the tray 100 as will be explained below. It is not beyond the scope of the present invention, however, to mold the two pieces separately which would then require that the mesh membrane 124 be attached afterwards.

FIG. 2 illustrates the dental impression tray 100 in its largest condition. The manner in which adjustments are made to the tray 100 to make it smaller is illustrated best in the remaining figures. More particularly, located along the length of the posterior section 114 adjacent both of the distal ends 120 and 122 are a plurality of vertically extending pins such as shown at 128, 130, 132 and 134. These pins are separated by smaller intermediate portions such as shown at 136 and 138. While only two such pins and intermediate portions are shown, it should be readily apparent that there may be more than two or only one such pin and intermediate portion.

Figures 5, 6:
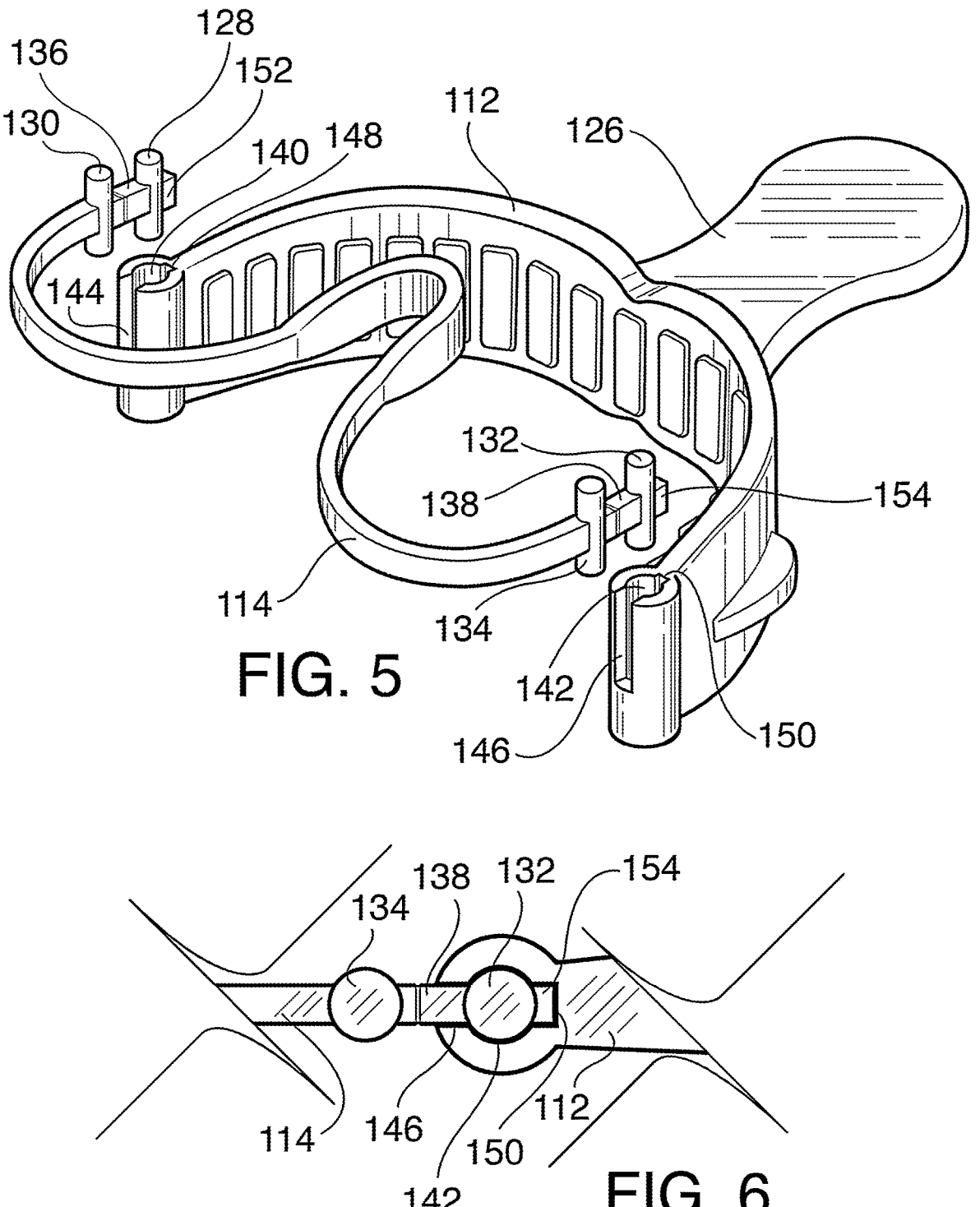
FIG. 5 is an exploded view similar to FIG. 2 but with parts removed in order to illustrate the manner in which adjustments to the size of the tray can be made.
FIG. 6 is a partial top view of the adaptive lock that forms part of the invention.

The distal ends 116 and 118 of the anterior section 112 each include a vertically extending opening such as shown at 140 and 142. The openings 140 and 142 are complementary in shape to the pins on the posterior section 114. As shown best in FIGS. 5 and 6, once the distal ends of the anterior and posterior sections are broken away from each other, the pins 128 and 132 can be slid down into the openings 140 and 142 at the distal ends of the anterior section 112. In FIG. 5, the mesh membrane has been removed strictly for illustration purposes.

It can also be seen from the figures, that the very distal ends of the anterior section 112 include vertically extending slots 144 and 146 which allow the intermediate portions 136 and 138 of the posterior section 114 to pass down therethrough. Similarly, the innermost part of the openings 140 and 142 include additional elongated slots 148 and 150 which accommodate the end portions 152 and 154 of the posterior section 114. In this way, any sharp edges on the ends of the posterior section after it is cut, are encapsulated by the slots so that they do not impinge, harm, cut, or otherwise cause pain to the patient . . . all of which can interfere with the accuracy of the impression.

Figures 3, 4:
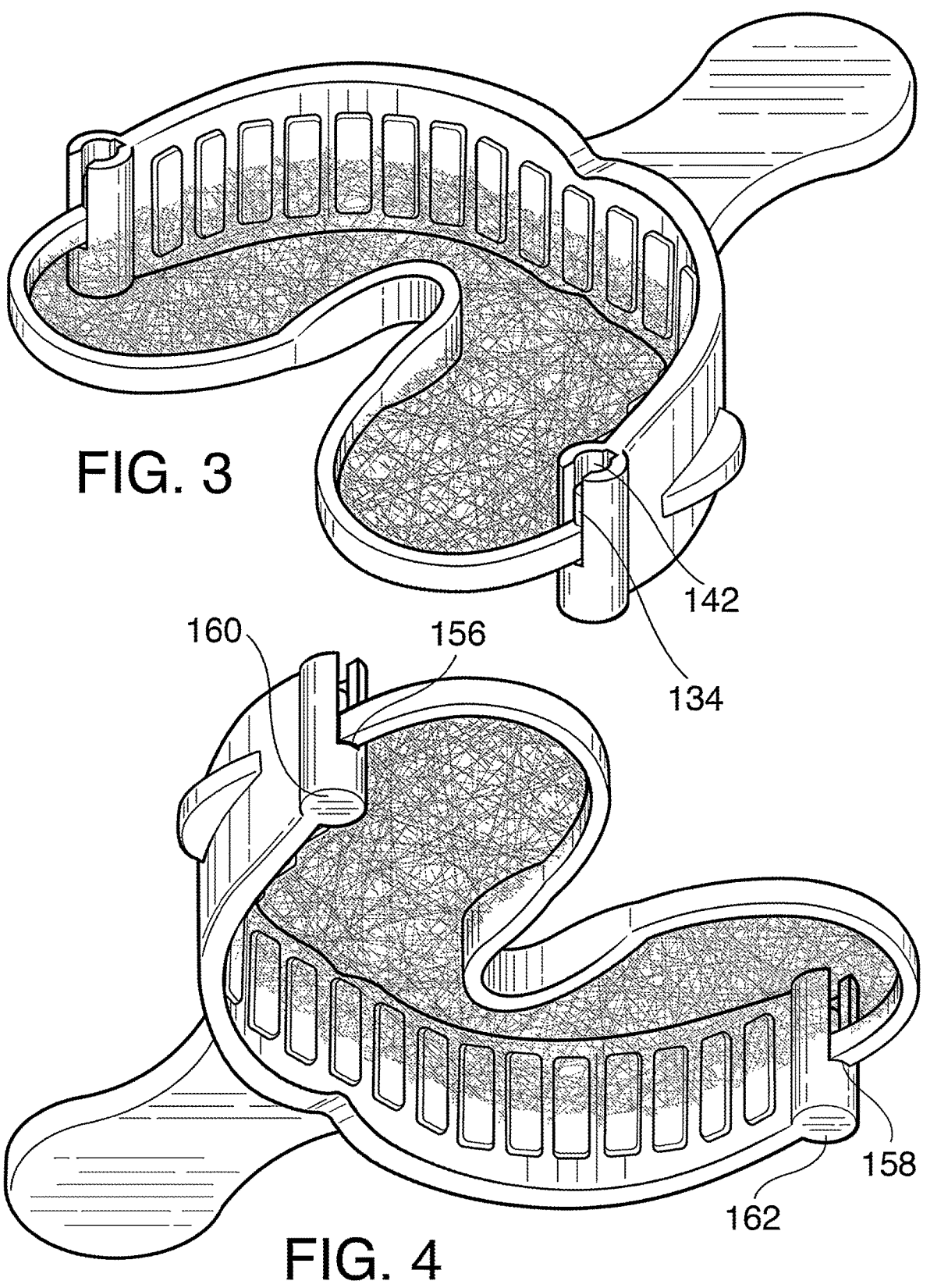
FIG. 3 is a view similar to FIG. 2 but adjusted for a smaller mouth of a patient.
FIG. 4 is a bottom perspective view of the dual arch adjustable dental impression tray of FIG. 3.

While FIG. 2 shows the dental tray 100 in its largest condition, FIGS. 5 and 6 show the same in an intermediate size as only one pin from the posterior section 114 is inserted into the openings of the anterior section. On the other hand, FIGS. 3 and 4 illustrate the smallest condition wherein the first pin is removed and the second pin 134 is inserted into the opening 142. Thus, the dental tray 100 of FIG. 2 can be adjusted to three different sizes. Obviously with more pins on the posterior section 114, additional smaller sizes are also possible. Furthermore, the entire dental tray 100 can be made in multiple sizes such as small, medium and large thereby allowing for multiple different size trays to be created.

The pins and intermediate or end portions of the posterior section 114 cannot, of course, pass down all the way through the openings in the distal ends of the anterior section. This is accomplished by having both the ledges 156 and 158 and the lower walls 160 and 162 as shown most clearly in FIG. 4. These components 156, 158, 160 and 162 could all be considered bottom walls. Furthermore, while the circular members 128 and 132, for example, have been referred to as pins while the intermediate portions 136 and 138 or the end portions 152 and 154 have been referred to as other components, all of these can be considered pins. That is, for example, the element 132 and end portion 154 along with the intermediate portion 138 can collectively be considered a pin. This "pin" is, therefore, not circular in cross-section. As a result, and particularly because of the end portion 154 entering the additional slot 150 in the opening 142, the same becomes more stable as it cannot freely rotate about the vertical axis of the element 132. It provides for a much more stable and rigid connection.

Figure 7:
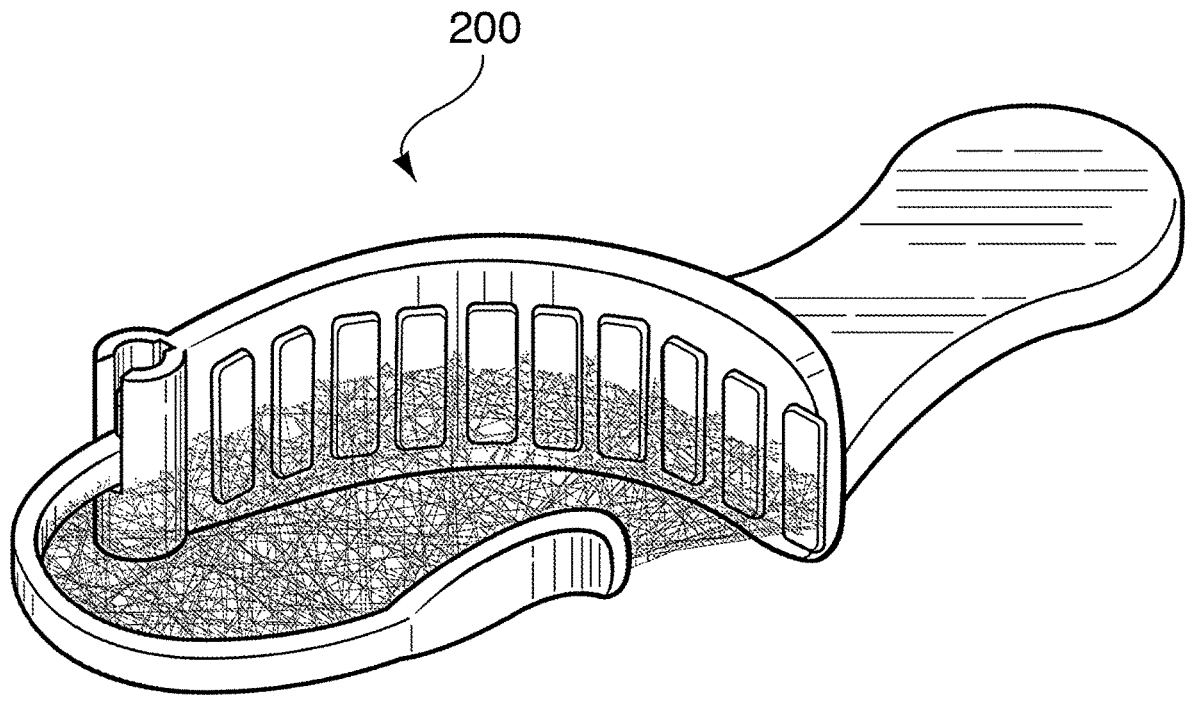
FIG. 7 is a front perspective view of a second embodiment of the adjustable dental impression tray with adaptive lock of the invention showing a single arch.

While the dental tray 100 shown in FIGS. 2-6 is essentially for both left and right arches and both top and bottom teeth, it should be readily apparent to those skilled in the art that the same concepts can be used for only the upper or only the lower utilizing a design closer to that shown in FIG. 1 but with the adjustable means or it can be designed to be used as a single arch such as illustrated in the embodiment shown at 200 in FIG. 7.

Further, it will be clear to one of ordinary skill in the art that in embodiments, the pins may be located at the distal end of an anterior section and the openings may be located at the distal end of a posterior section. Connections may be formed by one of the sections having a vertically extending opening and the other of said sections having at least one vertically extending pin adapted to slide vertically into said opening, the openings and pins being of complementary shape. These complementary shapes serve to further lock or re-attach the device.

The present invention may be embodied in other specific forms without departing from the spirit or essential attributes thereof and accordingly, reference should be made to the appended claims rather than to the foregoing specification as indicating the scope of the invention.

What is claimed:

1. An adjustable dual arch dental impression tray comprising:
    an anterior section and a posterior section, the anterior section and the posterior section lying essentially in a horizontal plane, each of the anterior section and the posterior section having a distal end;
    a mesh membrane extending between the anterior section and the posterior section; and
    a handle extending from the anterior section away from the posterior section,
    wherein the anterior section and the posterior section are connected to form a dual arch tray configured as having breakaway modularity, wherein the breakaway modularity allows the tray to be adjusted to accommodate a patient's arch size,
    one of the anterior section and the posterior section having at least two vertically extending openings that are perpendicular to the plane of the tray, and the other of the anterior section and the posterior section having at least two vertically extending elements,
    the elements adapted to slide into the openings, the openings and the elements being of complementary shape, and
    the vertically extending openings further comprising an elongated slot capable of receiving breakaway fragments attached to the complementary shaped elements.

2. The adjustable dental impression tray as claimed in claim 1, wherein the openings are located at the distal end of the anterior section and the elements are located at the distal end of the posterior section, and wherein the elements extend perpendicularly with respect to the plane of the tray.

3. The adjustable dental impression tray as claimed in claim 2, wherein the elements and the openings are non-circular in cross-section.

4. The adjustable dental impression tray as claimed in claim 1, wherein each vertically extending opening includes a bottom wall which prevents the elements from passing entirely through the openings.

5. The adjustable dental impression tray as claimed in claim 1, wherein the posterior section has a length and includes a plurality of the elements located in a series of predetermined breakaway junctures along a portion of the posterior section's length.

6. The adjustable dental impression tray as claimed in claim 1, wherein the posterior section of the tray curves inward and toward the midline of the oral cavity, while remaining substantially in the horizontal plane of the tray.

7. The adjustable dental impression tray as claimed in claim 1, wherein the vertically extending openings are disposed on a distal end of the handle, and wherein at least one element is disposed on the posterior section.

8. The adjustable dental impression tray as claimed in claim 1, wherein at least one element is disposed on a distal end of the handle, and wherein the vertically extending openings are disposed on the posterior section.

9. The adjustable dental impression tray as claimed in claim 1, wherein each of the elements is one of a pin, a shaft, a rectangle, or another geometry.

10. The adjustable dental impression tray as claimed in claim 1, wherein the handle and the posterior section are of various sizes.

11. The adjustable dental impression tray as claimed in claim 1, wherein each of the handle and the posterior section is configured to be one of disposable or re-usable.

12. The adjustable dental impression tray as claimed in claim 1, wherein each of the handle and the posterior section have at least one of an attached mesh or a replaceable mesh.

13. An adjustable dental impression tray comprising:

an anterior section and a posterior section, the anterior section and the posterior section lying essentially in a horizontal plane, wherein each of the anterior section and the posterior section comprises an arrangement of distal ends that are connectable and disconnectable from the other section, wherein one of the anterior section and the posterior section further comprises elongated slots to accommodate a complementary end of the other section; and a handle extending from the anterior section away from the posterior section, wherein the anterior section and the posterior section are connected in a single tray with a predetermined breakaway modularity comprising at least two regions disposed on lateral sides of a section, wherein the at least two regions are configured to breakaway, wherein the anterior section and the posterior section are configured to reconnect after breaking by the breakaway modularity to form a tray of a different size after removal of at least part of the breakaway region, one of the anterior section and the posterior section having at least one vertically extending opening adjacent its distal end after the breaking away, and the other of the anterior section and the posterior section having at least one vertical extending element adjacent its distal ends after the breaking away of the initially connected single tray, and the opening and the element being of complementary shape.

14. The adjustable dental impression tray as claimed in claim 13, wherein the distal ends of the anterior section are configured to be cut and then reconnected to the distal ends of the posterior section, wherein the sections are configured to be reconnected by inserting a element from one section into an opening of the other section.

15. The adjustable dental impression tray as claimed in claim 13, wherein the vertically extending openings are disposed on a distal end of the handle, and wherein at least one element is disposed on the posterior section.

16. The adjustable dental impression tray as claimed in claim 13, wherein at least one element is disposed on a distal end of the handle, and wherein the vertically extending openings are disposed on the posterior section.

17. The adjustable dental impression tray as claimed in claim 13, wherein each of the elements is one of a pin, a shaft, a rectangle, or another geometry.

18. The adjustable dental impression tray as claimed in claim 13, wherein the handle and the posterior section are of various sizes.

19. The adjustable dental impression tray as claimed in claim 13, wherein each of the handle and the posterior section is configured to be one of disposable or re-usable.

20. The adjustable dental impression tray as claimed in claim 13, wherein each of the handle and the posterior section have at least one of an attached mesh or a replaceable mesh.

* * * * *